United States Patent
Li et al.

(10) Patent No.: US 11,196,351 B2
(45) Date of Patent: Dec. 7, 2021

(54) BURST MODE OPERATION FOR A RESONANT CONVERTER

(71) Applicant: TEXAS INSTRUMENTS INCORPORATED, Dallas, TX (US)

(72) Inventors: Yalong Li, Allen, TX (US); Maxim James Franke, Dallas, TX (US); John C. Vogt, Denton, TX (US); Brent Alan McDonald, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 60 days.

(21) Appl. No.: 16/727,187

(22) Filed: Dec. 26, 2019

(65) Prior Publication Data

US 2020/0266712 A1 Aug. 20, 2020

Related U.S. Application Data

(60) Provisional application No. 62/805,651, filed on Feb. 14, 2019.

(51) Int. Cl.
| | |
|---|---|
| *H02M 3/156* | (2006.01) |
| *H02M 3/337* | (2006.01) |
| *H02M 3/158* | (2006.01) |
| *H02M 3/335* | (2006.01) |
| *H02M 1/00* | (2006.01) |

(52) U.S. Cl.
CPC ......... *H02M 3/3376* (2013.01); *H02M 3/158* (2013.01); *H02M 3/33507* (2013.01); *H02M 1/0035* (2021.05)

(58) Field of Classification Search
None
See application file for complete search history.

(56) References Cited

U.S. PATENT DOCUMENTS

| | | | |
|---|---|---|---|
| 9,991,801 B2 | 6/2018 | Wang et al. | |
| 2003/0012065 A1* | 1/2003 | Chang | H04L 25/061 365/200 |
| 2006/0044854 A1* | 3/2006 | Bocchiola | H02M 1/4208 363/86 |
| 2018/0054134 A1* | 2/2018 | Moon | H02H 1/0007 |

OTHER PUBLICATIONS

Huang, Hong. "Designing an LLC Resonant Half-Bridge Power Converter." 2010 Texas Instruments Power Supply Design Seminar, SEM1900, Topic 3. TI Literature No. SLUP263, 30 pages.
Texas Instruments. "UCC25640x LLC Resonant Controller with Ultra-Low Audible Noise and Standby Power." SLUSD90—Jun. 2019, pp. 1-62.

* cited by examiner

*Primary Examiner* — Jeffrey A Gblende
(74) *Attorney, Agent, or Firm* — Mark Allen Valetti; Charles A. Brill; Frank D. Cimino

(57) ABSTRACT

A circuit includes a first driver, a second driver, and a burst mode control circuit coupled to the first and second drivers. The burst mode control circuit is configured to implement a burst mode operation having a burst soft-on portion and a burst portion. During the soft-on portion of the burst mode operation, the burst mode control circuit is configured to cause the first and second drivers to produce a first set of pulses of increasing pulse width. During the burst portion of the burst mode operation, the burst mode control circuit is configured to cause the first and second drivers to produce a second set of pulses of a constant pulse width.

20 Claims, 11 Drawing Sheets

US 11,196,351 B2

BURST MODE OPERATION FOR A RESONANT CONVERTER

CROSS-REFERENCE TO RELATED APPLICATIONS

This application claims priority to U.S. Provisional Application No. 62/805,651, filed Feb. 14, 2019, which is hereby incorporated by reference.

BACKGROUND

Resonant converters generate a square wave of voltage or current which is supplied to a resonant circuit. Energy circulates in the resonant circuit, and some or all of it is used to supply the output energy to a load. One type of resonant converter is the LLC resonant converter. An LLC resonant converter architecture includes a resonant capacitor and two inductors. One inductor is the magnetizing inductance of the converter's transformer and the other inductor is a resonant inductor. A pair of transistor switches is coupled to the resonant circuit formed by the resonant capacitor, resonant inductor, and the magnetizing inductance of the transformer. The transistor pair creates the square wave voltage or current provided to the resonant circuit.

SUMMARY

In accordance with an example, a circuit includes a first driver, a second driver, and a burst mode control circuit coupled to the first and second drivers. The burst mode control circuit is configured to implement a burst mode operation having a burst soft-on portion and a burst portion. During the soft-on portion of the burst mode operation, the burst mode control circuit is configured to cause the first and second drivers to produce a first set of pulses of increasing pulse width. During the burst portion of the burst mode operation, the burst mode control circuit is configured to cause the first and second drivers to produce a second set of pulses of a constant pulse width.

BRIEF DESCRIPTION OF THE DRAWINGS

For a detailed description of various examples, reference will now be made to the accompanying drawings in which.

DETAILED DESCRIPTION

Figure 1:
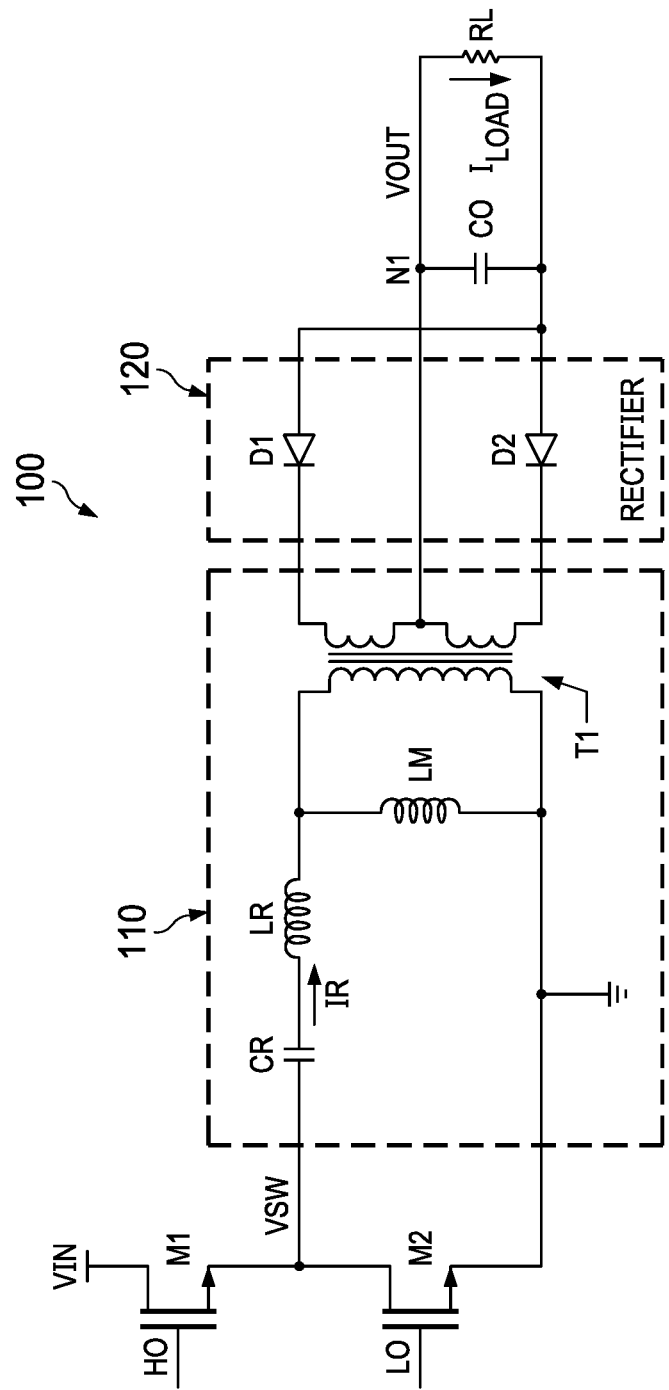
FIG. 1 illustrates an example of a resonant converter.

FIG. 1 shows an example implementation of an LLC resonant converter. The example converter includes transistors M1 and M2, a resonant circuit and isolation transformer 110, a rectifier 120, and an output capacitor CO. The LLC resonant converter 100 generates an output voltage VOUT, which can be provided to a load (RL). The output voltage VOUT is provided on output node N1. The gate signal to M1 is HO and the gate signal to M2 is LO. The source of M1 is connected to the drain of M2 at a switch node referred to as VSW. The input voltage VIN is coupled to the drain of M1. The resonant circuit 110 comprises resonant capacitor CR, a resonant inductor LR and a transformer T1. The transformer T1 has a magnetizing inductor Lm. The rectifier 120 comprises diodes D1 and D2 coupled to the secondary side of transformer T1.

When M1 is on (and M2 is off), VSW becomes equal to VIN. When M2 is on (and M1 is off), VSW equals ground. As M1 and M2 are reciprocally turned on and off, the VSW voltage is a square wave. The square wave VSW voltage is provided to the resonant circuit 110, which has a resonant frequency close to the fundamental frequency of the square wave. The current through the resonant circuit 110 is shown as IR and is referred to as the resonant current.

Figure 2:
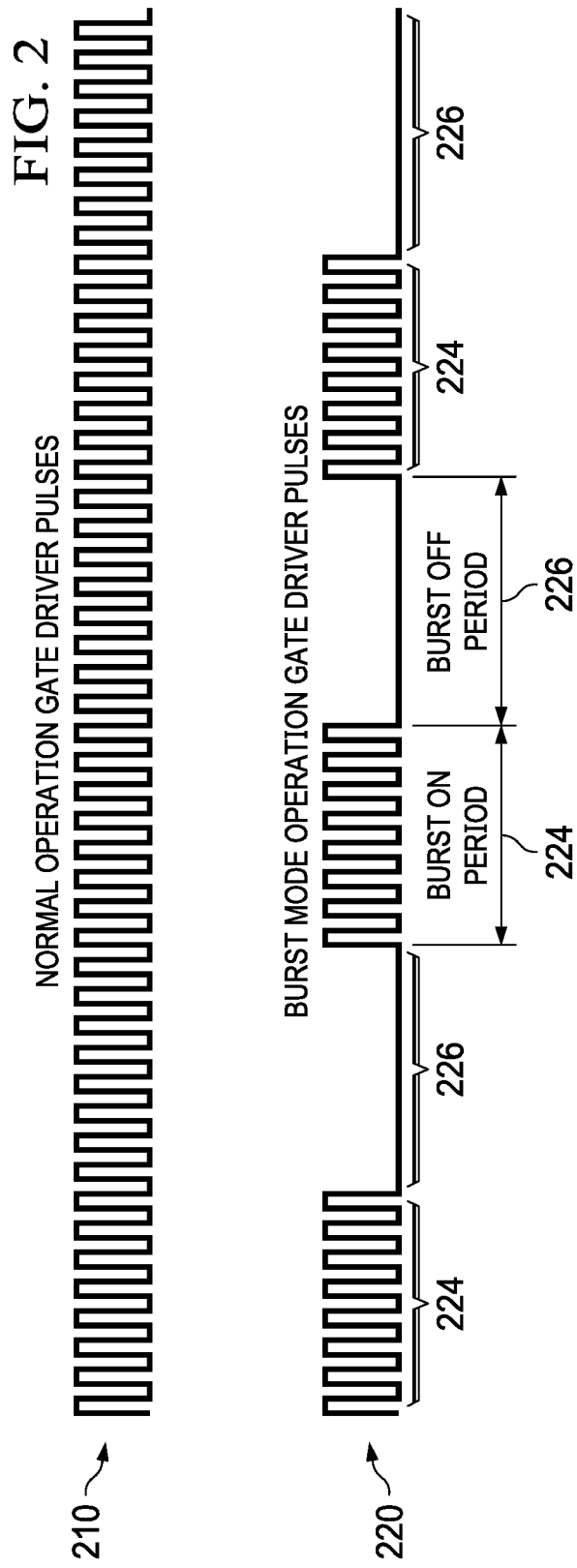
FIG. 2 illustrates a burst mode operation of the resonant converter.

FIG. 2 shows at 210 the waveform of the gate drive signals HO and LO. When HO is high to turn on M1, LO should be low to turn off M2, and when LO is high to turn on M2, HO should be low to turn off M1. The example waveform 210 in FIG. 2 is applicable to one of HO or LO, with the other gate drive signal having the same waveform but out of phase from that shown (i.e., M1 and M2 are not on simultaneously).

Transistors are characterized by switching and conduction losses during the time in which the transistor is changing state from off to on, or on to off. During light load conditions (e.g., relatively low current draw by a load), an LLC resonant converter may suffer from poor efficiency due to the switching loss of the pair of transistors within the LLC resonant converter. Burst mode control in the LLC resonant converter can be used to improve light load efficiency. FIG. 2 shows an example waveform 220 of the gate drive signal (for HO and LO) to implement burst mode operation. The waveform 220 includes burst on periods 224 separated by burst off (also called burst idle) periods 226. During each burst on period 224, M1 and M2 are reciprocally turned on and off. During the burst off period 226, both M1 and M2 remain off. During light load conditions, the LLC resonant converter 100 is operated in a burst mode in which the LLC resonant converter is operated at relatively high power for a short burst period and then switching is stopped for the burst off period. During the burst on period 224, excess charge is stored in the output capacitor CO. During the burst off period 226, the charge previously stored in CO is used to supply the current (Iload) through the load (RL).

The rapid change of the resonant current IR during the transition between burst on and burst off periods causes an audible noise. The change in current through the transformer core causes the magnetic field of the transformer to change, which cause the core to physically vibrate due to magnetostriction. The audile noise can be annoying and thus undesirable.

Figure 3:
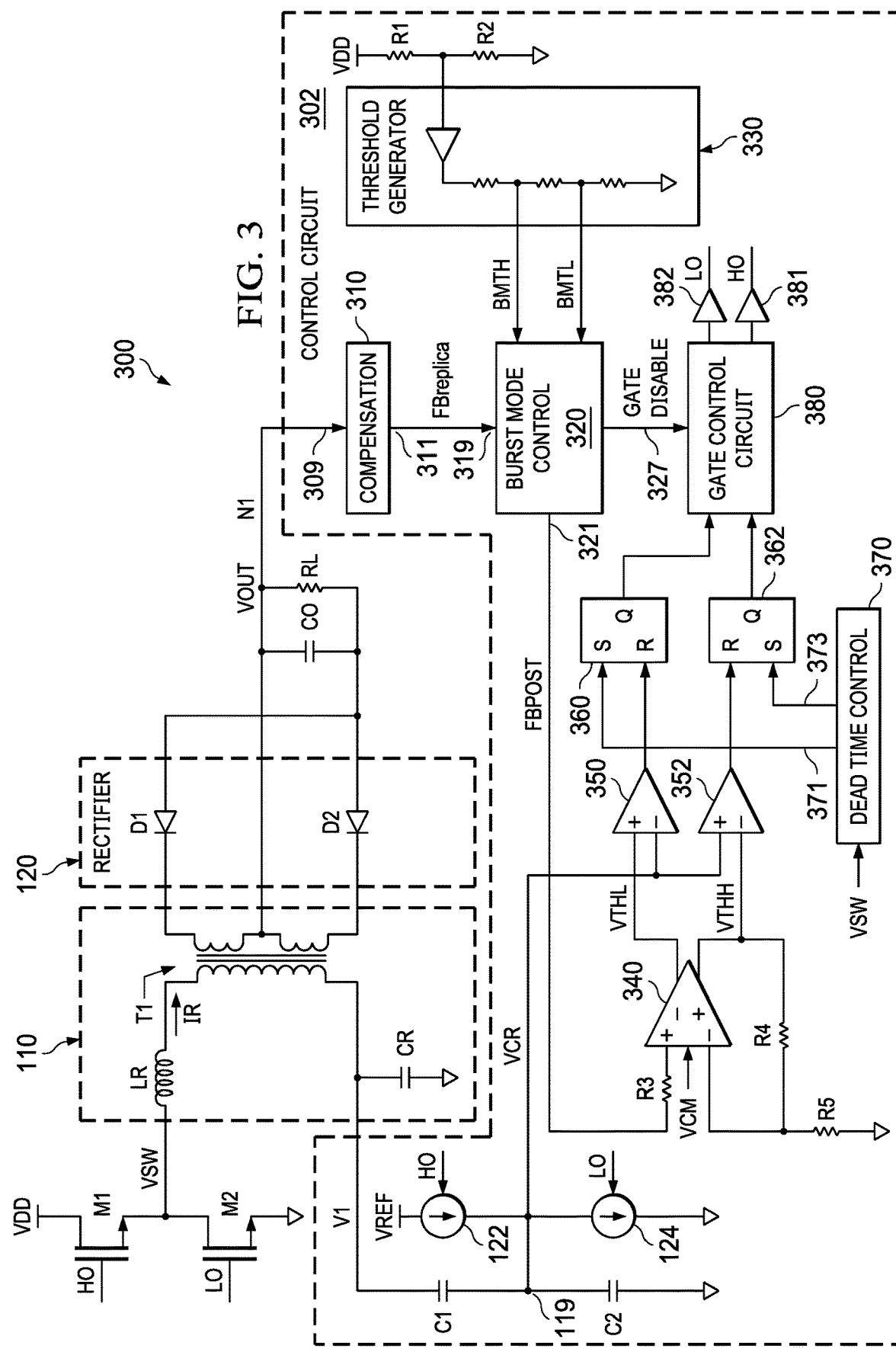
FIG. 3 illustrates an example of a resonant converter that implements a soft-on and soft-off burst mode operation.
Figure 4:
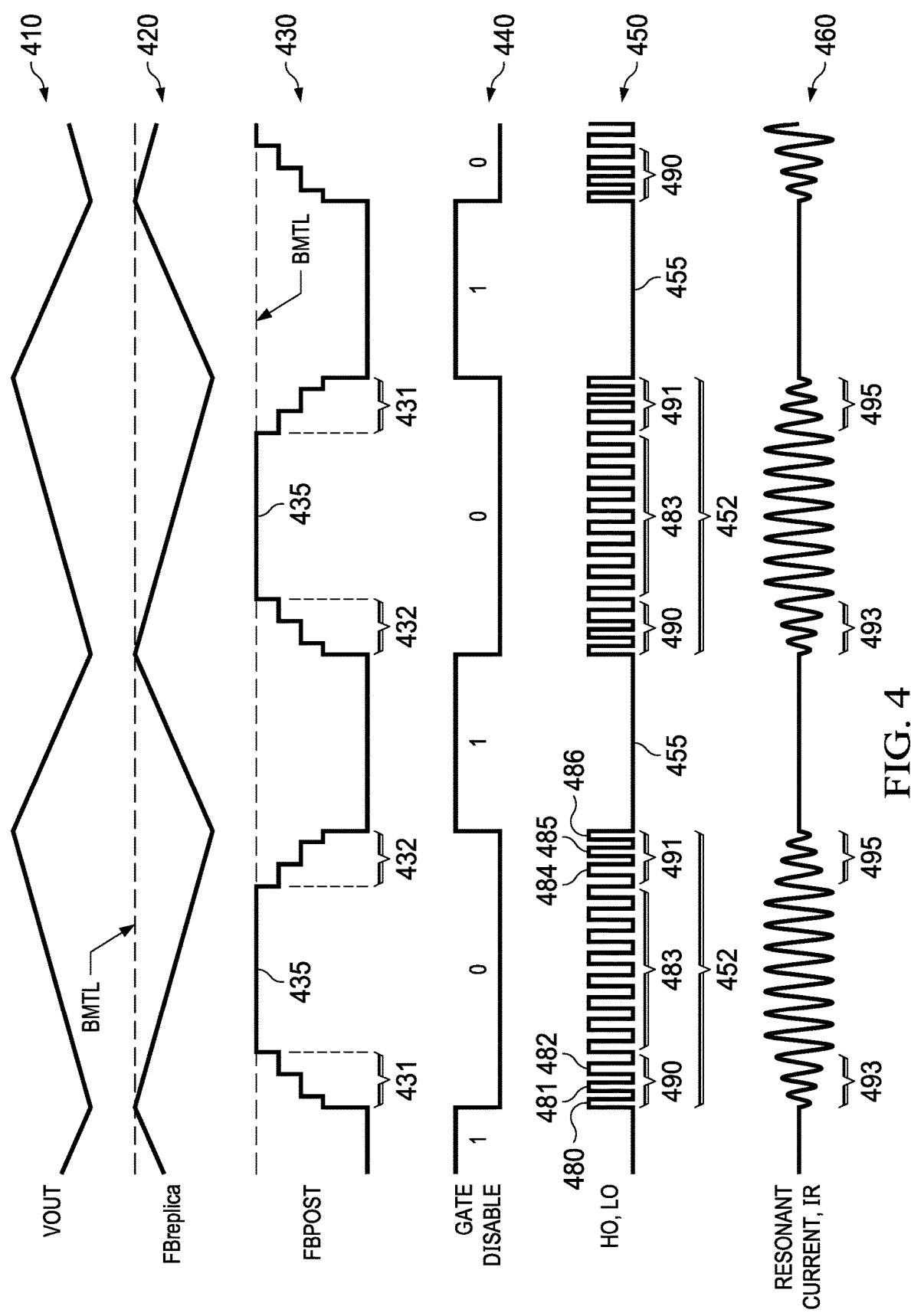
FIG. 4 is an example timing diagram of various signals within the resonant converter of FIG. 4.

FIG. 3 shows an example of a resonant converter 300 (e.g., an LLC resonant converter) that reduces or eliminates audible noise during burst mode operation. Referring to FIG. 3 and a corresponding timing diagram of FIG. 4, resonant converter 300 includes the components of FIG. 1 (M1, M2, LR, T1, D1, D2, CR, CO, and RL) and also includes a control circuit 302. The control circuit 302 in this example includes a compensation circuit 310, a burst mode control circuit 320, a threshold generator 330, capacitors C1 and C2, current source devices 122 and 124, resistors R1, R2, R3, R4, and R5, amplifier 340, comparators 350 and 352, set-reset (SR) SR flip-flops 360 and 362, dead time control circuit 370, and gate control circuit 380. The compensation circuit 310 includes an input 309 that is coupled to the output node N1. FIG. 4 shows an example of VOUT at 410. The compensation circuit 310 generates an output signal FBreplica on its output 311. FBreplica comprises a reciprocal version of VOUT, that is, as VOUT increases, FBreplica decreases, and vice versa. The output 311 (FBreplica) of the compensation circuit 310 is coupled to an input 319 of the burst mode control circuit 320.

Figure 5:
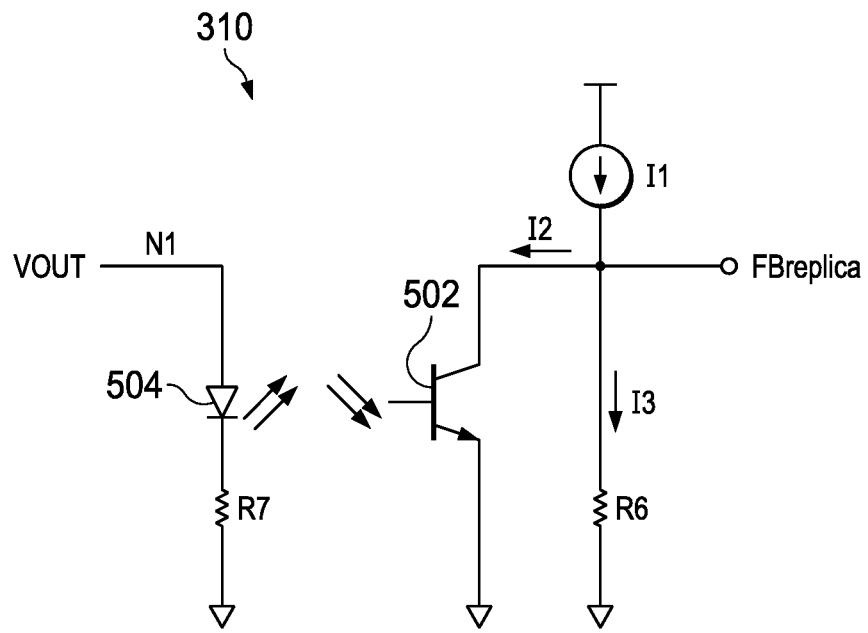
FIG. 5 illustrates an example of the generation of a control signal derived from an output voltage of the resonant converter.

FIG. 5 shows an example implementation of the compensation circuit 310. The compensation circuit 310 in this example includes a current source I1, resistor R6, and a photo transistor 502. A light emitting diode (LED) 504 is coupled to the output voltage node N1, and a resistor R7 is coupled to the LED 504. As VOUT increases, the current through the LED 504 increases, which causes an increase in light intensity from the LED 504. The increased light intensity is detected by photo transistor 502. The photo transistor 502 is coupled to the current source and to resistor R6. The current I1 from the current source is divided as I2 through the photo transistor 502 and I3 through resistor R6. As the light intensity detected by the photo transistor 502 increases, the current I2 also increases, which forces I3 to decrease through resistor R6. The voltage across resistor R6 is the FBreplica voltage. Accordingly, FBreplica decreases as VOUT increases, and vice versa. FIG. 4 shows an example 420 of FBreplica.

Resistors R1 and R2 in FIG. 3 are connected in series from the supply voltage node (VDD) and ground and comprise a voltage divider which is coupled to an input of the threshold generator 330. The threshold generator 330 generates a higher threshold voltage (BMTH) and a lower threshold voltage (BMTL) using, for example, a voltage divider coupled to an output of a buffer. The BMTH and BMTL voltages are provided to the burst mode control circuit 320. Based on the relation of FBreplica to BMTL and BMTH, the burst mode control circuit 320 generates an output signal FBPOST on an output 321. FBPOST is provided to resistor R3, which is coupled to the positive input of differential amplifier 340. Based on the magnitude of FBPOST, the differential amplifier 340 generates differential threshold output signals VTHL and VTHH. VTHH and VTHL have a common mode voltage equal to VCM, which is the common mode voltage of V1 (the voltage across the resonant capacitor CR. The voltage difference between VTHH and VTHL is equal to FBPOST. The voltage separation between VTHH and VTHL is a function of FBPOST—the larger is FBPOST, the larger is the separation between VTHH and VTHL, and vice versa.

The negative output of the differential amplifier 340 is coupled to the positive input of comparator 350, and the positive output of the differential amplifier 340 is coupled to the negative input of comparator 352. The output of comparator 350 is coupled to the reset (R) of SR flip-flop 360 and the output of comparator 352 is coupled to the R input of SR flip-flop 362. The dead time control circuit 370 generates output signals 371 and 373. Output signal 371 is provided to the set (S) input of SR flip-flop 360 and output signal 373 is provided to the S input of SR flip-flop 362. The Q outputs of the SR flip-flops 360 and 362 are coupled to the gate control circuit 380. The gate control circuit 380 generates the HO signal for the gate of M1 and the LO signal for the gate of M2 via gate drivers 381 and 382, respectively. The burst mode control circuit 320 generates a Gate Disable signal 327 to the gate control circuit 380. When the Gate Disable signal 327 is asserted (e.g., high), the gate control circuit 380 responds by causing both HO and LO to be at a state (e.g., low) such that M1 and M2 are turned off.

Referring still to FIG. 3, capacitors C1 and C2 are coupled in series between the primary winding of transformer T1 and ground. The node between C1 and C2 is labeled 119. Current source device 122 is coupled between a reference voltage (VREF) and node 119, and current source device 124 is coupled between node 119 and ground. Each current source device 122 and 124 is controlled (on and off) by a control signal. HO is coupled to and turns on and off current source device 122 and LO turns on and off current source device 124. When HO is asserted high, current flows through current source device 122 into node 119 and charges capacitor C2 thereby causing the voltage on node 119 (labeled VCR) to increase. When LO is asserted high, capacitor C2 discharges through current source device 124 thereby decreasing the voltage on node 119. The node connecting the primary winding of transformer T1 and the resonant capacitor CR has a voltage shown as V1. The resonant circuit 110 converts the square wave signal on the VSW node to a generally sinusoidal voltage V1. Resonant capacitor CR (and thus voltage V1) is coupled to capacitor C1. The voltage VCR is the sum of the sinusoidal voltage V1 and the ramp voltage generated on node 119 by the current source devices 122 and 124 charging and discharging capacitor C2.

Figure 6:
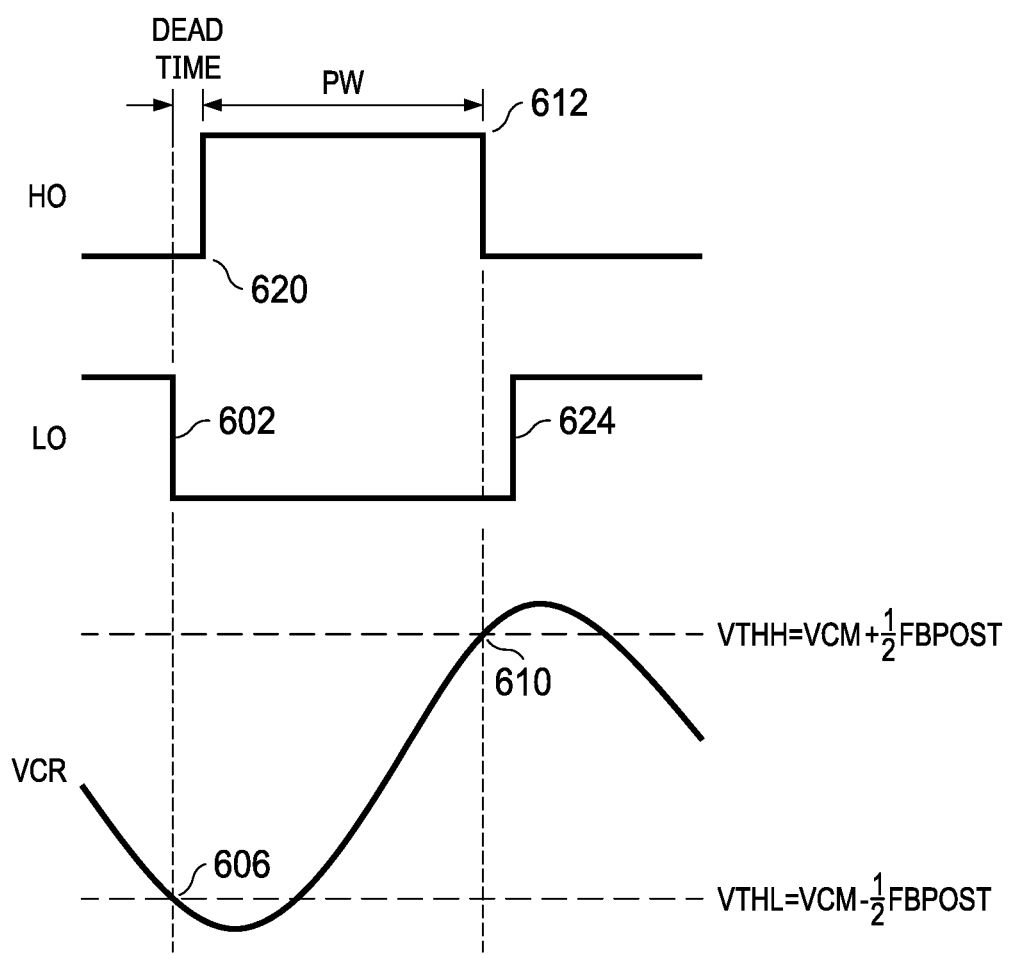
FIG. 6 illustrates the relationship between a signal generated within the resonant converter and two threshold signals to control the pulse width of gate signals to the resonant converter's high and low side transistors.

FIG. 6 shows an example of a waveform for VCR. The common node voltage level of VCR is VCM, which is the common mode voltage of V1. FIG. 6 also shows examples of VTHH and VTHL. VTHH, generated on the positive output of differential amplifier 340, is VCM+½*(FBPOST). VTHL, generated on the negative output of differential amplifier 340, is VCM−½*(FBPOST).

Node 119 is coupled to the negative input of comparator 350 and to the positive input of comparator 352. As such, comparator 350 compares VCR to VTHH and comparator 352 compares VCR to VTHL. The output from comparator 350 will be high when VCR is less than VTHL and low when VCR is greater than VTHL. The output from comparator 352 will be high when VCR is greater than VTHH and low when VCR is less than VTHH.

Referring to FIGS. 3 and 6, when VCR falls below VTHL (shown at 606), the output signal from comparator 350 becomes a logic high to the R input of SR flip-flop 360 thereby causing its Q output to be a logic 0. The logic 0 from SR flip-flop 360 is provided by the gate control circuit 380 as the LO control signal for M2. As such, when VCR falls below VTHL, M2 is turned off as shown at 602 in FIG. 6. Following a dead time period (implemented by dead time control circuit 370 to ensure M1 and M2 are not on simultaneously) of time later, the dead time control circuit 370 asserts a high signal on the S input of SR flip-flop 362 which causes its Q output to produce a logic high level. The gate control circuit 380 provides the Q output of the SR flip-flop 362 as the HO control signal to M1. With the Q output of the SR flip-flop 362 being logic high, following the dead time HO becomes logic high (620) to turn on M1.

When VCR then exceeds VTHH (610), the output signal from comparator 352 becomes a logic high to the R input of SR flip-flop 362 thereby causing its Q output to be a logic 0. The logic 0 from SR flip-flop 362 is provided by the gate control circuit 380 as the HO control signal for M1. As such, when VCR exceeds VTHH, M1 is turned off as shown at 612 in FIG. 6. Following the dead time period implemented by dead time control circuit 370, the dead time control circuit 370 asserts a high signal on the S input of SR flip-flop 360 which causes its Q output to produce a logic high level. The gate control circuit 380 provides the Q output of the SR flip-flop 360 as the LO control signal to M2. With the Q output of the SR flip-flop 360 being logic high, following the dead time LO becomes logic high (624) to turn on M2.

The pulse width of HO is shown as PW in FIG. 6. The LO pulses have the same pulse width PW. The width of the pulses is a function of the difference between VTHH and VTHL, which is also a function of FBPOST. The smaller is FBPOST, the smaller is the difference between VTHH and VTHL and the smaller is PW. Conversely, the larger is FBPOST, the larger is the difference between VTHH and VTHL and the larger is PW. Thus, the width of the HO and LO pulses are directly correlated to the magnitude of FPOST. The burst mode control circuit 320 thus controls the width of the HO and LO pulses by controlling the magnitude of FBPOST.

Figure 7:
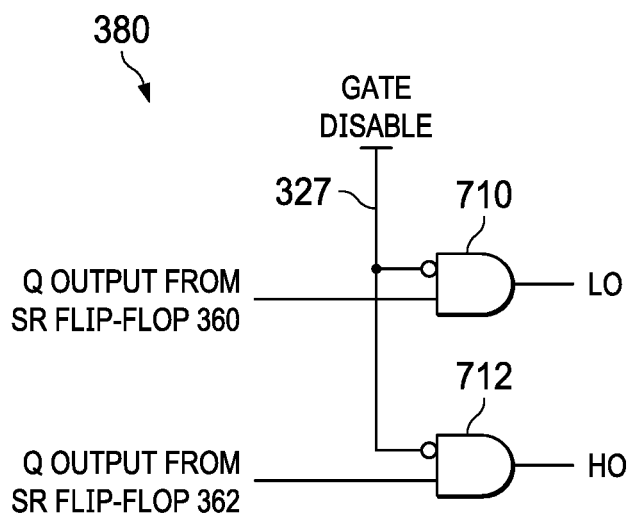
FIG. 7 is an example implementation of a gate control circuit within the resonant converter of FIG. 4.

The gate control circuit 380 includes one or more logic gates to disable LO and HO (e.g., force LO and HO both to be low) to prevent M1 and M2 from being on. FIG. 7 shows an example implementation of gate control circuit 380. In this example, gate control circuit 380 includes AND gates 710 and 712. AND gate 710 includes inputs that couple to the Q output of the SR flip-flop 360 and to the burst mode control circuit 320 to receive the Gate Disable signal 327. Similarly, AND gate 712 includes inputs that couple to the Q output of the SR flip-flop 362 and to the burst mode control circuit 320 to receive the Gate Disable signal 327. In an example in which the Gate Disable signal 327 is active high, the Gate Disable signal is provided to an inverted input of AND gates 710 and 712. In other examples, the Gate Disable signal 327 is active low and thus is coupled to a non-inverting input of AND gates 710 and 712. AND gates 710 and 712 gate on and off the Q output signals from the respective SR flip-flops 360, 362 based on the logic state of the Gate Disable signal 327. When Gate Disable 327 is active (e.g., high in the example of FIG. 7), both LO and HO are forced low to thereby turn off M1 and M2. The Gate Disable signal 327 may be asserted during the burst off time periods 226 (FIG. 2) to ensure neither M1 nor M2 is on.

Referring again to FIG. 4, an example of the Gate Disable signal 327 is shown at 440. When Gate Disable is logic low (0), the Q output signals from the SR flip-flops 360 and 362 are provided on to the outputs of the AND gates 710 and 720. Waveform 450 represents one of the HO or LO signals during burst mode operation, with the other LO/HO signal having the same waveform shape but out of phase and including the dead time period explained above. When Gate Disable is logic low (0), The HO and LO signals are pulsed high and low as shown at 452. When Gate Disable is asserted high (1), both HO and LO are forced low as shown at 455. The pulses at 452 represent the burst-on mode of operation and the low signal level at 455 represents the burst-off mode of operation. Waveform 460 represents resonant current IR.

The FBPOST and HO/LO waveforms 430 and 450 in FIG. 4 illustrate "soft-on" and "soft-off" burst mode operation, which helps to reduce audible noise. As will be explained below, during the transition period 431 between low and high, FBPOST is step-wise incremented as shown. Similarly, during the transition period 432 between high and low, FBPOST is step-wise decremented. As explained above, the magnitude of FBPOST controls the width of the HO and LO pulses. The burst mode control circuit 320 thus step-wise increments FBPOST during transition period 431 which causes the width of the HO/LO pulses to increase from pulse 480 to 481 to 482. The width of the pulses 483 after pulse 482 remain the same as (or larger than) the width of pulse 482. The burst mode control circuit 320 then step-wise decrements FBPOST during transition period 432 which causes the width of the HO/LO pulses to decrease from pulse 484 to 485 to 486, as shown. The number of HO/LO pulses during the transitions 431 can be different from that shown (e.g., more or fewer step-wise increments and decrements).

The HO/LO pulses at 490 whose pulse widths are increasing occur during the soft-on portion of the burst mode and the pulses at 491 whose pulse widths are decreasing occur during the soft-off portion of the burst mode. The soft-on portion (490) of the burst mode causes the resonant current to gradually increase as shown at 493. The soft-off portion (491) of the burst mode causes the resonant current to gradually decrease as shown at 495. Compared to implementing constant pulse widths for HO and LO during each entire burst-on phase, because the resonant current changes more gradually during the soft-on and soft-off phases of the burst mode operation illustrated in FIG. 4, the resonant converter described herein produces less, or no, audible sound. The gradually increased or decreased resonant current due to the soft-on and soft-off modes helps to suppress the fluctuation of the transformer's magnetic field change. As a result, the physical vibration of the transformer is reduced thereby reducing the magnitude of the audible noise.

Figure 8A:
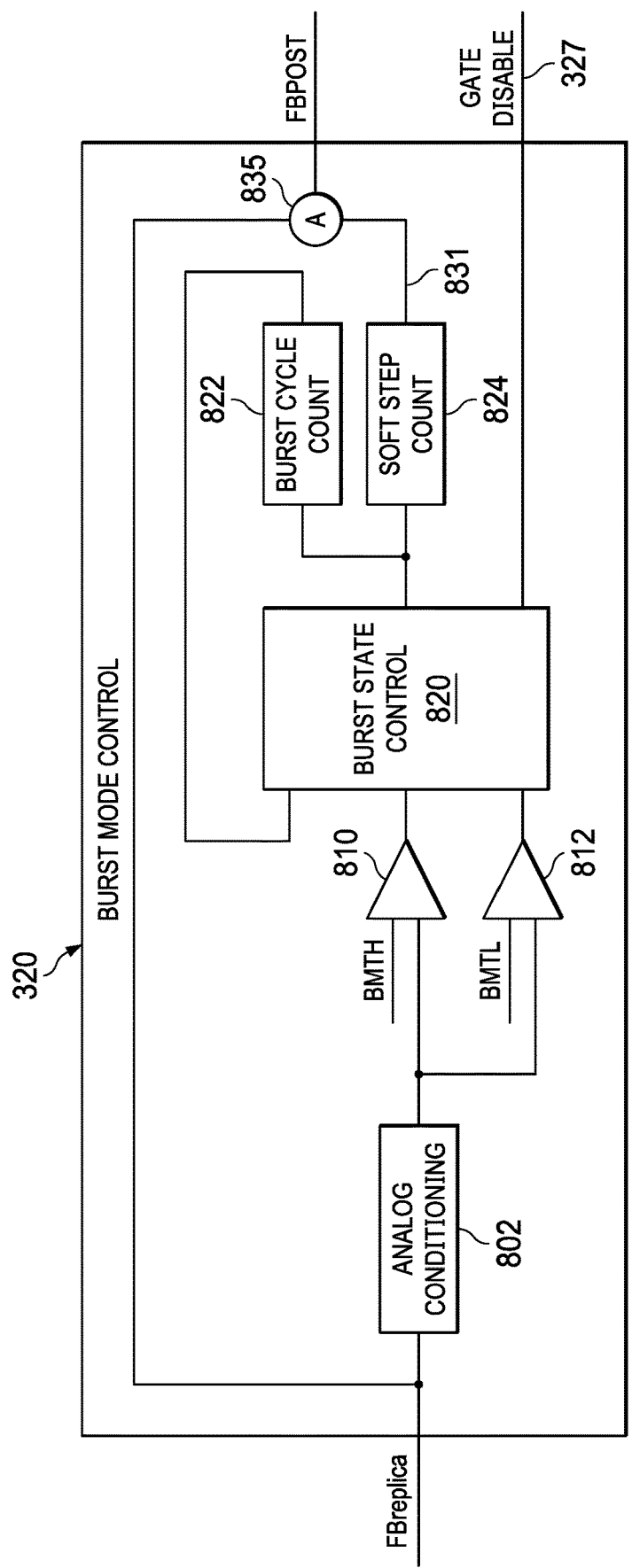
FIG. 8A is an example implementation of a burst mode control circuit within the resonant converter of FIG. 4.

FIG. 8A shows an example implementation of the burst mode control circuit 320. In this example, the burst mode control circuit 320 includes an analog conditioning circuit 802, comparators 810 and 812, a burst state control circuit 820, a burst cycle counter 822, a soft step counter 824, and a programmable attenuator 835. The analog conditioning circuit 802 includes an input and an output, and the input receives FBreplica. The analog conditioning circuit 802 may include a buffer, voltage level shifter, and/or other circuitry to condition FBreplica for comparison to BMTH and BMTL. Comparator 810 compares FBreplica to BMTH and comparator 812 compares FBreplica to BMTL. The outputs of comparators 810 and 812 are coupled to the burst state control circuit 820.

Figure 8B:
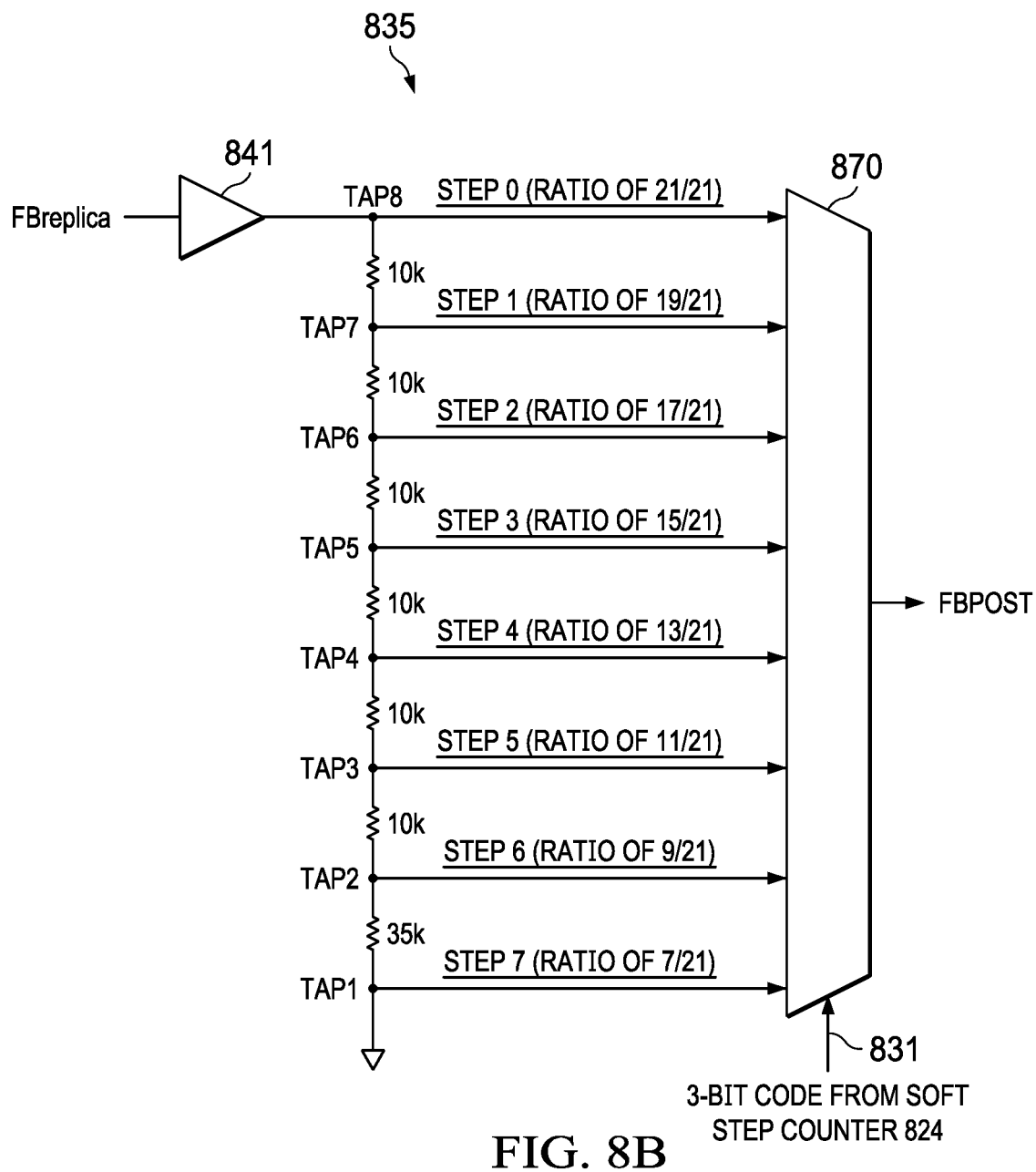
FIG. 8B shows an example of a programmable attenuator.

Programmable attenuator 835 comprises, for example, a dynamically-configurable resistor divider network. The voltage applied to the resistor divider network within the attenuator is FBreplica and the digital signal 831 from the soft step counter 824 selects the particular tap within the resistor divider network to provide FBPOST. FIG. 8B shows an example of the attenuator 835. The attenuator 835 in this example is a resistor divider with eight tap points (Tap 1 through Tap 8). The resistors of the resistor dividers include 10 kohm resistors in series with one 35 kohm resistor as shown. FBreplica is provided via a buffer 841 across the string of series-connected resistors. Tap 1 is coupled to ground by a 35 kohm resistor in this example, and the remaining resistors are 10 kohm resistors as shown. As such, the voltage of Tap 1 is 7/21 times FBreplica. The voltage of Tap 2 is 9/21 times FBreplica, and so on. The voltage of Tap 8 is 21/21 of FBreplica, and thus is equal to FBreplica. The eight tap points are connected to a multiplexer 870, and the control signal to select one of the channels of the multiplexer is the digital signal 831 (e.g., a 3-bit digital value) from the soft step counter 824. In this example, the digital signal 831 selects one of the eight tap point voltages as FBPOST. During a full burst mode (e.g., 224 in FIGS. 2 and 483 in FIG. 4), FBPOST is equal to FBreplica, and is less than FBreplica during soft-on and soft-off burst modes.

The burst state control circuit 820 couples to, and controls the operation of, the burst cycle counter 822 and the soft step counter 824. The output of the burst cycle counter 822 is coupled to the burst state control circuit 820 to permit the burst state control circuit 820 to determine the count value of the burst cycle counter 822. The output of the soft step counter 824 is coupled to the programmable attenuator 835 as described above. During the soft-on portion 490 (FIG. 4) and soft-off portion 491, the programmable attenuator 835 generates FBPOST at a lower level than FBreplica based on the digital signal 831 from the soft step counter 824.

In one implementation, the burst state control circuit 820 comprises one or more of logic gates (e.g., AND gates, OR gates, exclusive-OR gates, etc.), flip-flops, comparators, etc. In another implementation, the burst state control circuit 820 comprises one or more processors coupled to a non-volatile storage device (e.g., memory). The storage device may contain machine instructions that are executed by processor(s).

Figure 9:
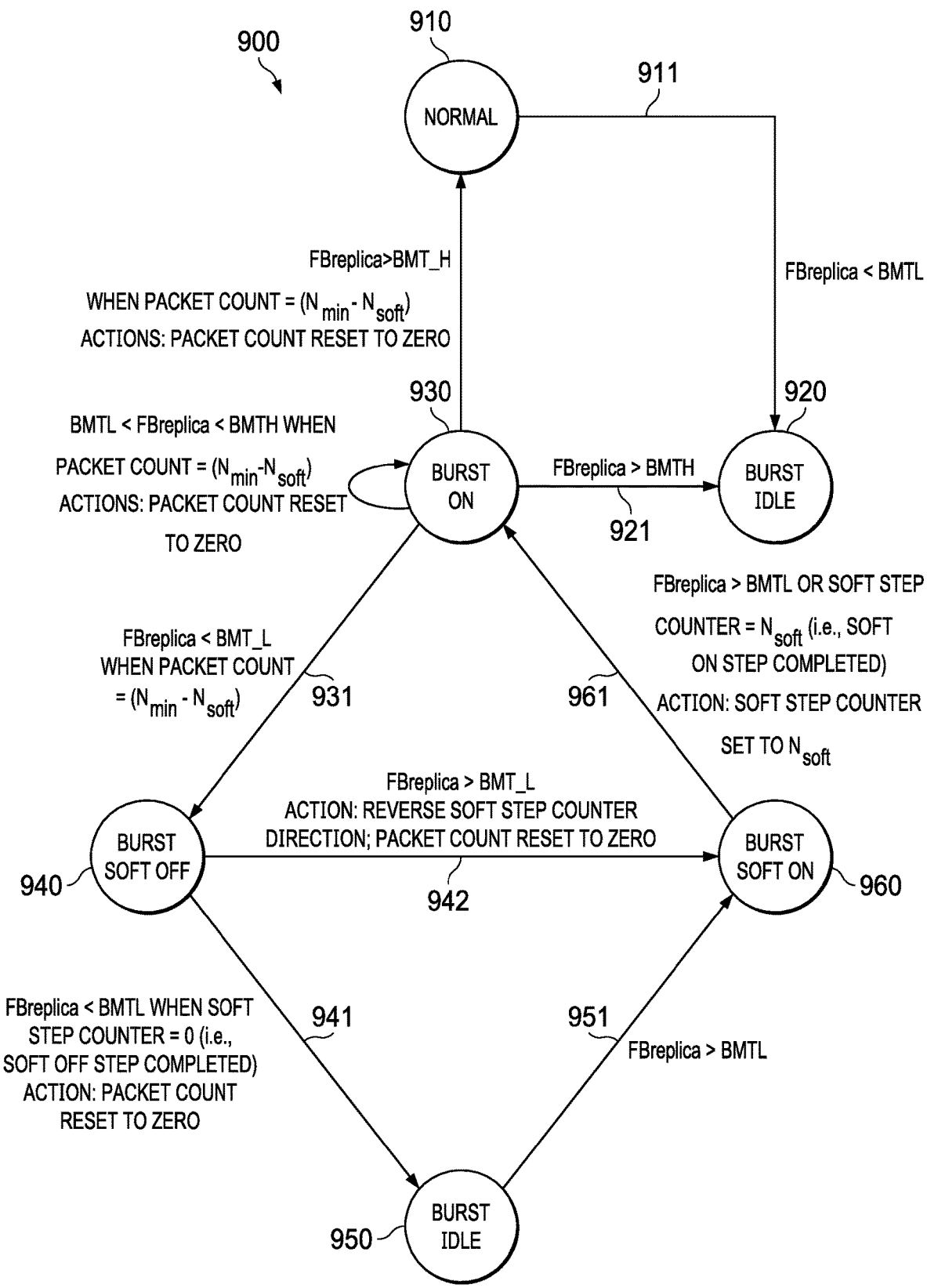
FIG. 9 is an example state diagram illustrating the operation of the burst mode control circuit of FIG. 8A.
Figure 10:
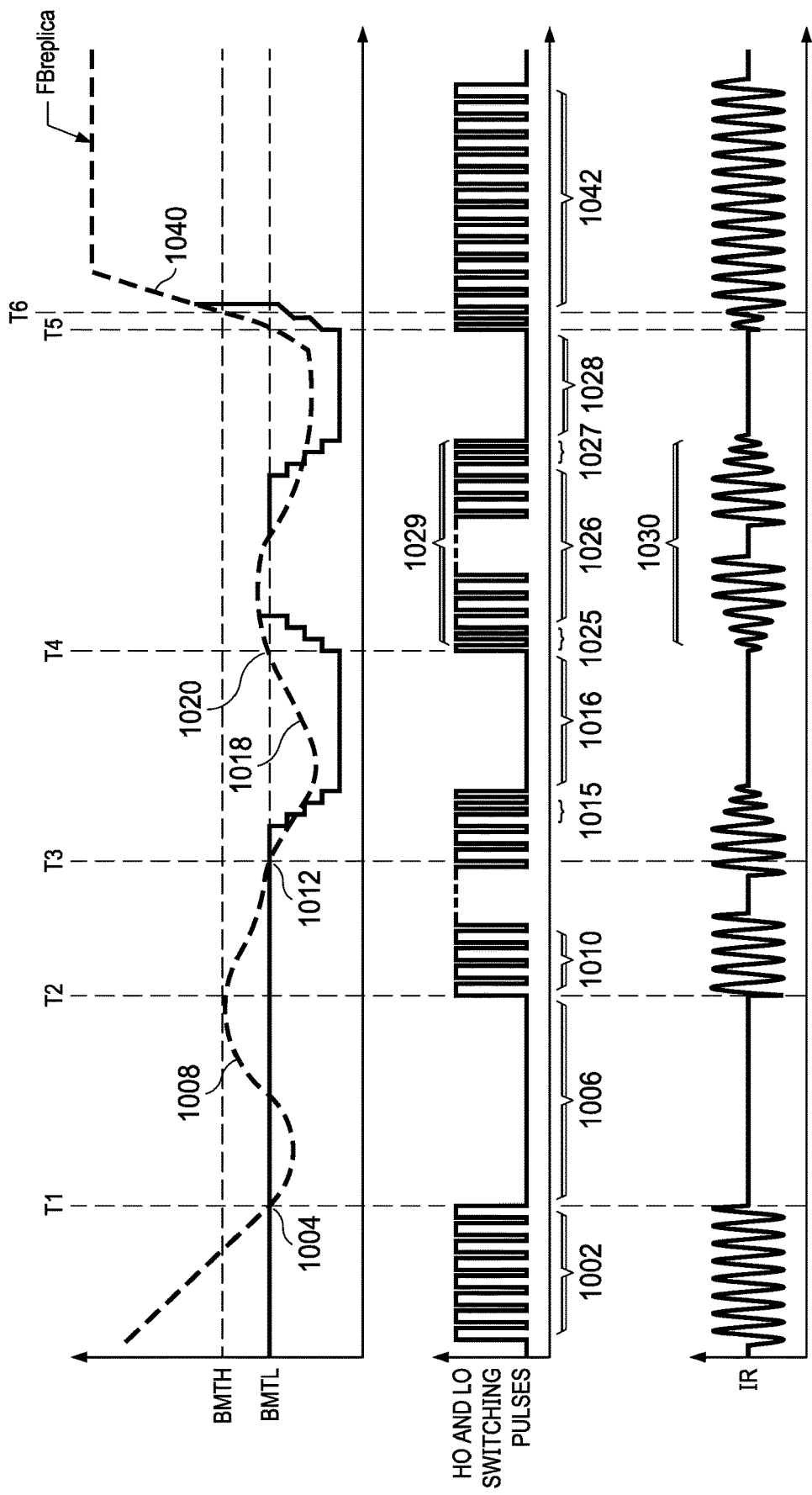
FIG. 10 is a timing diagram further illustrating the operation of the burst mode control circuit of FIG. 8A.

FIG. 9 is an example state diagram 900 illustrating the states and state transitions implemented by the burst state control circuit 820. The example states include a Normal state 910, Burst Idle states 920 and 950, Burst On state 930, a Burst Soft Off state 940, and a Burst Soft On state 960. FIG. 10 is a sample timing diagram which is useful to further illustrate the operation of the burst state control circuit in conjunction with the state diagram 900 of FIG. 9. As is explained below, the state transitions are dictated, at least in part, based on a comparison of FBreplica to the BMTH or BMTL. FBreplica is inversely proportional to VOUT as explained above. As such, a decreasing FBreplica corresponds to an increasing VOUT, and an increasing FBreplica corresponds to a decreasing VOUT.

The burst state control circuit 820 initializes to the Normal state 910 and remains in the Normal state 910 until transition 911 occurs. While in the Normal state 910, the Gate Disable signal 327 is deasserted (e.g., 0) by the burst state control circuit 820 thereby resulting in a continuous stream of HO and LO pulses to M1 and M2 as illustrated at 1002.

Transition 911 occurs when FBreplica is less than BMTL, which is indicative of VOUT increasing. In the example of FIG. 10, FBreplica falls below BMTL at 1004. When FBreplica falls below BMTL (as detected by the burst state control circuit 820 monitoring the output of comparator 812), the burst state control circuit 820 transitions to the Burst Idle state 920. While in the Burst Idle state 920, the burst state control circuit 920 asserts Gate Disable 327 to cause the gate control circuit 380 to disable (e.g., force to logic low) HO and LO to thereby turn off both M1 and M2. As a result, the switching pulses of HO and LO cease as indicated in FIG. 10 at 1006.

With the cessation of the switching pulses of HO and LO, VOUT begins to decrease, and thus FBreplica begins to increase as shown at 1008. When FBreplica reaches BMTH, the operational state of the burst state control circuit 820 changes from the Burst Idle state 920 to the Burst On state 930 as indicated by state transition 921. During the Burst On state 930, FBPost is set to its maximum value (e.g., as indicated at 435 in FIG. 4). With FBPost at its maximum value, the width of the HO and LO pulses are set at their maximum widths as indicated at, for example, 483 in FIG. 4. The relationship between FBPost and the width of the pulses of HO and LO is explained above. Reference numeral 1010 illustrated the HO and LO switching pulses during the Burst On state 930.

During the Burst On state 930, the burst state control circuit 820 de-asserts Gate Disable 327 for at least long enough to permit a predetermined minimum number of HO and LO switching pulses to occur. By way of definition, the minimum number of pulses caused to be delivered by the burst state control circuit 820 during a burst mode is N min. In one example, N min is 40 meaning that at least 40 HO and 40 LO switching pulses are generated during the Burst on state 930. The number of pulses during either of the soft-on or soft-off portions is referred to as Nsoft and soft step counter 824 is used to ensure compliance with Nsoft during the soft-on and soft-off portions. The first burst mode at 1010 does not include a soft-on portion but does include a soft-off portion 1015. As the total number of pulses during the initial burst is N min, then the number of pulses during the Burst On state 930 in which the pulses widths are their maximum is N min−Nsoft. The burst state control 820 initiates the burst cycle counter 822 to begin counting (e.g., cycles of a clock signal). The output count value from the burst cycle counter 822 is received by the burst state control 820 to ensure that the desired number of pulses during the Burst On state 930 is reached. The burst state control circuit 820 remains in the Burst On state 930 as long as FBreplica is between BMTL and BMTH and the count value from the burst cycle counter 822 (shown in FIG. 9 as the "packet count") has not reached N min−Nsoft.

At 1012, FBreplica falls below BMTL. When FBreplica falls below BMTL and the count value from the burst cycle counter 822 has reached N min−Nsoft, the state of the burst state control circuit 820 changes from the Burst On state 930 to the Burst Soft Off state 940 accord to transition 931. During the Burst Soft Off state 940, the burst state control circuit 820 initiates the soft step counter 824 to count, for example, down, with each successive count output value from the soft step counter 924 being converted to an analog voltage and used to attenuate FBreplica to thereby generate a progressively smaller FBPost, as illustrated at 432 in FIG. 4. As a result of FBPost becoming progressively smaller during the Burst Soft Off state 940, the widths of the HO and LO pulses also become progressively smaller as illustrated at 1015 in FIG. 10.

In one example, the soft-on and soft-off portions of each burst cycle includes seven steps. Table I below includes the fractions for each step that are used to attenuate FBreplica to thereby produce FBPost.

| Burst Soft-On and Soft-Off Step | Fraction Used to Reduce FBreplica to produce FBPost |
| --- | --- |
| 1 | 7/21 |
| 2 | 9/21 |
| 3 | 11/21 |
| 4 | 13/21 |
| 5 | 15/21 |
| 6 | 17/21 |
| 7 | 19/21 |

During a soft-on portion, the burst state control circuit 820 initiates the soft step counter 824 to count up from 1 to 7. At each count value (1, 2, 3, . . . ), the fraction listed above in Table I is programmed into the programmable attenuator 835 to produce the corresponding fraction of FBreplica (7/21*FBreplica, 9/21*FBreplica, etc.) to produce an increasing level for FBPOST. During a soft-off portion, the burst state control circuit 820 programs the soft step counter 824 to count down from 7 to 1 so that the decreasing fractions (19/21, 17/21, etc.) are applied to FBreplica via the resistor divider and multiplexer of FIG. 8B and using the digital signal 831 to produce a decreasing level for FBPOST.

When the soft step counter's output count value reaches its terminal value (e.g., 0), and if FBreplica is less than BMTL (which indicates that the soft-off portion of the burst has completed), then the state of the burst state control circuit 820 transitions from the Burst Soft Off state 940 to the Burst Idle state 950 as indicated by state transition 941. During the Burst Idle state 950, the burst state control circuit 820 de-asserts Gate Disable to prevent the generation of any HO or LO pulses to M1 and M2, respectively, as indicated at 1016.

With no HO or LO pulses VOUT begins to decrease and thus FBreplica begins to increase as shown at 1018. When FBreplica exceeds BMTL as indicated at 1020, the state of the burst state control circuit 820 changes from the Burst Idle state 950 to the Burst Soft On state 960 as indicated by state transition 951. During the Burst Soft On state 960, the burst state control circuit 820 initiates the soft step counter 824 to begin counting (e.g., up) for the number of steps of the soft-on portion (Nsoft). Each successive count value output from the soft step counter 824 is converted to an analog voltage and used to progressively increase FBPost by programmable attenuator 835 as shown at 431 (FIG. 4). As a result of a step-wise increase of FBPost, the width of the HO and LO pulses also progressively increase as shown at 1025 (FIG. 10).

When the soft step counter 824 reaches its terminal count corresponding to Nsoft, the state of the burst state control circuit 820 changes from the Burst Soft On state 960 to the Burst On state 930 as indicated by state transition 961. The operation of the burst state control circuit 820 during the Burst On state 930 is described above. The transition 962 from the Burst Soft On state 960 to the Burst On state 930 also may occur if FBreplica exceeds BMTL (even if the Nsoft terminal count has not yet been reached by the soft step counter 824), which indicates that VOUT is dropping too low, and maximum width HO and LO pulses are needed to quickly increase VOUT.

During burst mode operation, the state of the burst state control circuit 820 changes from Burst Soft On state 960 to Burst On state 930, to Burst Soft state 940 to Burst Idle state 950, back to Burst Soft On state 960, and so on, to thereby cause soft-on and soft-off burst 1029 followed by an idle state. During burst 1029, the width of the initial pulses at 1025 increase, and the width of the final pulses at 1027 decrease. The width of the pulses at 1026 between the soft-on and soft-off portions is constant and fixed at a maximum pulse width level. The resonant current IR also is shown in FIG. 10. During a soft-on/soft-off burst 1020, the envelope of the resonant current oscillations increases gradually the beginning of the burst and then decreases at the end of the burst. As a result of the gradual increase and decrease of the resonant current during burst mode operation, the resonant converter generates little or no audible noise.

Referring still FIG. 9, at the end of the Burst Soft Off state 940, if FBreplica is greater than BMTL (which indicates that VOUT is too low), then the state of the burst state control circuit 820 bypasses the Burst Idle state 950 and transitions per state transition 942 directly to the Burst Soft On state 960.

At 1040 in FIG. 10, FBreplica has exceeded BMTH, which causes the burst state control circuit 820 to initiate the Burst Soft On state 960, then transition to the Burst On state 930, and remain in the Burst On state 930 (indicated at 1042). If eventually, FBreplica falls below BMTH, the operation of the burst state control circuit 820 progresses as described above.

Figure 11:
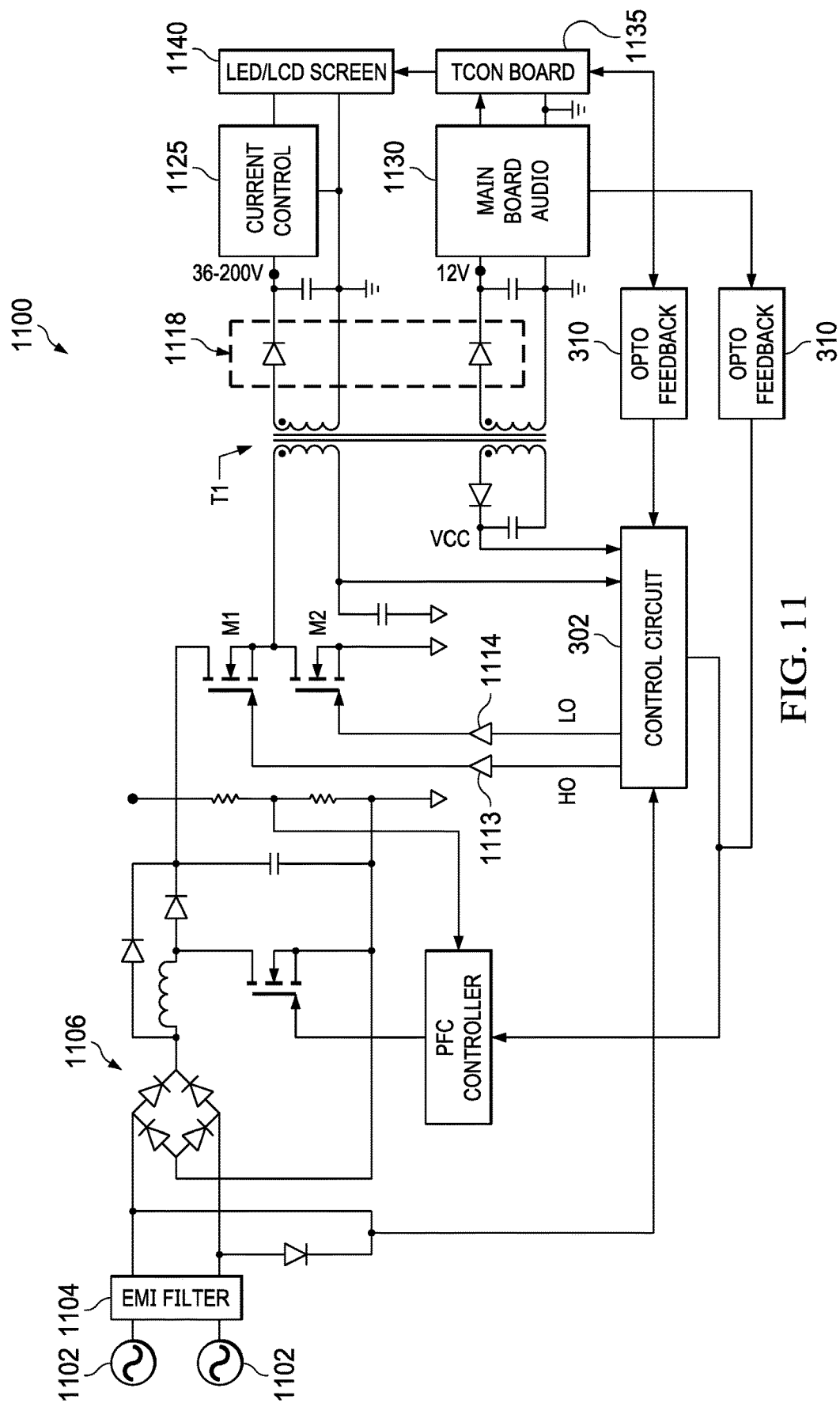
FIG. 11 is an example system illustrating the use of the resonant converter of FIG. 3.

The resonant converter described herein can be used in a variety of applications. FIG. 11 shows an example implementation of a television 1100 comprising the resonant converter described herein including the control circuit 302. As shown, the television 1100 includes and electromagnetic interference (EMI) filter 1104 to receive an alternating current (AC) voltage 1102. The output of the EMI filter 1104 is coupled to and, and rectified by, a full-wave diode rectifier 1106. The rectified voltage is provided to M1 as shown. The control circuit 302, which implements the soft-on/soft-off burst mode operation described herein, generates the HO and LO gate signals which are provided to M1 and M2 via gate drivers 1113 and 114, respectively. A rectifier 118 rectifies the output signal from the transformer's secondary windings to provide a supply voltage to a constant current (CC) control circuit 1125, which powers the televisions' display screen 1140. The rectifier's output also powers the electronics on the television's main audio circuit board 1130. The timing controller (TCON) board 1135 comprises a communication circuit that receives the signal from the main board 1130 to control the screen (e.g., dimming).

Because of the soft-on and soft-off portions of each burst of HO and LO switching pulses, the audible noise produced by the television's power supply is reduced compared to what would have been the case in the absence of any soft-on or soft-off burst mode control.

Other applications of the soft-on/soft-off burst mode control implemented by control circuit 302 includes a driver for light emitting diodes (LEDs), a power adapter for a laptop or notebook computer, and a charger for a power tool (e.g., drill, ratchet wrench, etc.).

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A circuit, comprising:
    a first driver;
    a second driver; and
    a burst mode control circuit coupled to the first and second drivers, wherein the burst mode control circuit is configured to implement a burst mode operation where each burst of the burst mode operation includes a burst soft-on portion and a burst portion, wherein:
        during the soft-on portion of the burst mode operation, the burst mode control circuit is configured to cause the first and second drivers to produce a first set of pulses of increasing pulse width; and during the burst portion of the burst mode operation, the burst mode control circuit is configured to cause the first and second drivers to produce a second set of pulses of a constant pulse width.

2. The circuit of claim 1, wherein:
the burst mode operation comprises a burst soft-off portion; and
during the burst soft-off portion, the burst mode control circuit is configured to cause the first and second drivers to produce a third set of pulses of decreasing pulse width.

3. The circuit of claim 2, wherein the burst portion is between the soft-on portion and the soft-off portion.

4. The circuit of claim 1, further comprising a gate control circuit coupled between the burst mode control circuit and the first and second drivers, wherein the burst mode control circuit is configured to generate a gate disable signal to the gate control circuit, wherein in a first state, the gate disable signal causes the gate control circuit to cause the first and second drivers to cease generating pulses.

5. The circuit of claim 1, further including a differential amplifier coupled to the burst mode control circuit, the differential amplifier having first and second differential amplifier outputs, wherein the differential amplifier produces a first threshold signal on the first differential amplifier output and a second threshold signal on the second differential amplifier output, wherein the burst mode control circuit is configured to generate a control signal to the differential amplifier, and wherein the differential amplifier is configured to generate the first and second threshold signals to have a voltage difference that is proportional to the control signal.

6. The circuit of claim 5, further comprising a first comparator coupled to the first differential amplifier output and a second comparator coupled to the second differential amplifier output.

7. The circuit of claim 1, wherein the burst mode control circuit includes:
a counter having a counter output; and
a digital-to-analog converter coupled to the counter output.

8. A method of controlling a resonant converter using burst mode operation including a series of bursts, the method comprising:
determining that a signal derived from an output voltage of the resonant converter is greater than a first threshold voltage;
generating a first set of switching pulses on a gate of a transistor during a beginning portion of each burst, the first set of switching pulses having progressively increasing pulse widths;
generating a second set of switching pulses on the gate of the transistor during a middle portion of each burst, the second set of switching pulses having a constant pulse width; and
generating a third set of switching pulses on the gate of the transistor during an ending portion of each burst, the third set of switching pulses having progressively decreasing pulse widths.

9. The method of claim 8, wherein the pulse widths of the second set of switching pulses is greater than or equal to a largest pulse width of the first or third sets of switching pulses.

10. The method of claim 8, further comprising:
following generating the third set of switching pulses, disabling generating any switching pulses for an idle time period; and
again generating the first set of switching pulses on the gate of the transistor, the first set of switching pulses having progressively increasing pulse widths.

11. The method of claim 8, further comprising:
following generating the third set of switching pulses, again generating the first set of switching pulses on the gate of the transistor, the first set of switching pulses having progressively increasing pulse widths.

12. A method of controlling a resonant converter, comprising:
determining that a signal derived from an output voltage of the resonant converter is greater than a first threshold voltage;
generating a first set of switching pulses on a gate of a transistor, the first set of switching pulses having progressively increasing pulse widths;
generating a second set of switching pulses on the gate of the transistor, the second set of switching pulses having a constant pulse width;
generating a third set of switching pulses on the gate of the transistor, the third set of switching pulses having progressively decreasing pulse widths; and
wherein,
generating the first set of switching pulses includes using a first counter to count a first predetermined number of switching pulses for the first set;
generating the second set of switching pulses includes using a second counter to count a second predetermined number of switching pulse for the second set; and
generating the third set of switching pulses includes using the first counter to count the first predetermined number of switching pulses for the third set.

13. A circuit, comprising:
a first comparator having a first comparator output and first and second comparator inputs;
a second comparator having a second comparator output and third and fourth comparator inputs;
a differential amplifier having a differential amplifier input and first and second differential amplifier outputs, the first differential amplifier output coupled to the first comparator input and the second differential amplifier output coupled to the third comparator input; and
a burst mode control circuit having first and second burst mode control outputs, the first burst mode control output coupled to the differential amplifier input.

14. The circuit of claim 13, wherein the second and fourth comparator inputs are configured to be coupled to a primary winding of a transformer.

15. The circuit of claim 13, further comprising:
a first flip-flop having a first flip-flop input and a first flip-flop output, the first flip-flop input coupled to the first comparator output;
a second flip-flop having a second flip-flop input and a second flip-flop output, the second flip-flop input coupled to the second comparator output.

16. The circuit of claim 15, further comprising a gate control circuit having first, second, and third gate control circuit inputs, the first gate control input coupled to the second burst mode control output, the second gate control circuit input coupled to the first flip-flop output, and the third gate control circuit input coupled to the second flip-flop output.

17. The circuit of claim 13, wherein the burst mode control circuit comprises a state control circuit, a first counter, and a resistor divider, the first counter coupled to the resistor divider, and the state control circuit coupled to the first counter.

18. The circuit of claim 17, wherein the burst mode control circuit comprises a second counter coupled to the state control circuit.

19. The circuit of claim 13, further comprising first and second drivers, and wherein the burst mode control circuit is configured to implement a burst mode operation comprising a burst soft-on portion and a burst portion, wherein:
- during the soft-on portion of the burst mode, the burst mode control circuit is configured to cause the first and second drivers to produce a first set of pulses of increasing pulse width; and
- during the burst portion of the burst mode, the burst mode control circuit is configured to cause the first and second drivers to produce a second set of pulses of a constant pulse width.

20. The circuit of claim 13, further comprising first and second drivers, and wherein the burst mode control circuit is configured to implement a burst mode operation comprising a burst soft-off portion and a burst portion, wherein:
- during the burst portion of the burst mode, the burst mode control circuit is configured to cause the first and second drivers to produce a second set of pulses of a constant pulse width; and
- during the soft-off portion of the burst mode, the burst mode control circuit is configured to cause the first and second drivers to produce a first set of pulses of decreasing pulse width.

* * * * *